United States Patent [19]

Ruhman et al.

[11] Patent Number: 4,491,932
[45] Date of Patent: Jan. 1, 1985

[54] ASSOCIATIVE PROCESSOR PARTICULARLY USEFUL FOR TOMOGRAPHIC IMAGE RECONSTRUCTION

[75] Inventors: Smil Ruhman; Isaac Scherson, both of Rechovot, Israel

[73] Assignee: Yeda Research & Development Co. Ltd., Rechovot, Israel

[21] Appl. No.: 307,663

[22] Filed: Oct. 1, 1981

[51] Int. Cl.³ .................. G06F 13/00; G11C 15/00
[52] U.S. Cl. .................. 364/900; 364/414; 364/194
[58] Field of Search ... 364/200 MS File, 900 MS File, 364/194, 413, 414, 415

[56] References Cited

U.S. PATENT DOCUMENTS

| | | | |
|---|---|---|---|
| 3,320,594 | 5/1967 | Davies | 364/200 |
| 3,350,698 | 10/1967 | Pritchard | 364/200 |
| 3,470,540 | 9/1969 | Levy | 364/200 |
| 3,771,139 | 11/1973 | Digby | 364/200 |
| 3,936,806 | 2/1976 | Batcher | 364/200 |
| 4,068,305 | 1/1978 | Cutler | 364/200 |
| 4,244,033 | 1/1981 | Hattori | 364/900 |

OTHER PUBLICATIONS

IEEE International Conference on Circuits and Computers, (10/1-10/3, 1980), "Many-To-Many Arithmetic in Associative Memory and Its Application to Tomographic Back-Projection", By Ruhman et al., Paper Pub. Oct. 1, 1980.

*Primary Examiner*—James D. Thomas
*Assistant Examiner*—William G. Niessen
*Attorney, Agent, or Firm*—Benjamin J. Barish

[57] ABSTRACT

In an associative processor particularly useful for tomographic image reconstruction, the associative memory is partitioned into an array of associative processors concurrently performing the same function with different operands on disjoint data sets. The array is dynamically reconfigurable, and the partitioning is completely flexible, with individual processors free to assume any size and topology.

While the new associative processor is of broad application, its power is specifically demonstrated for tomographic image reconstruction by the well-known convolution-back-projection method.

10 Claims, 4 Drawing Figures

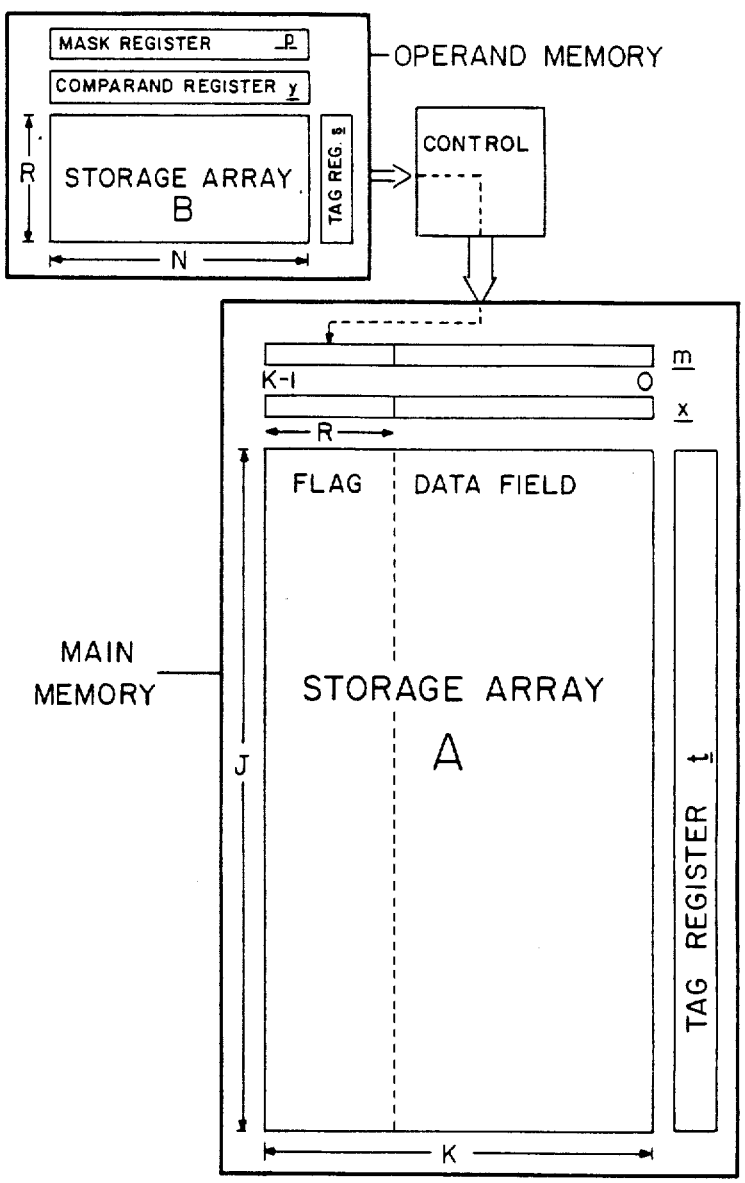

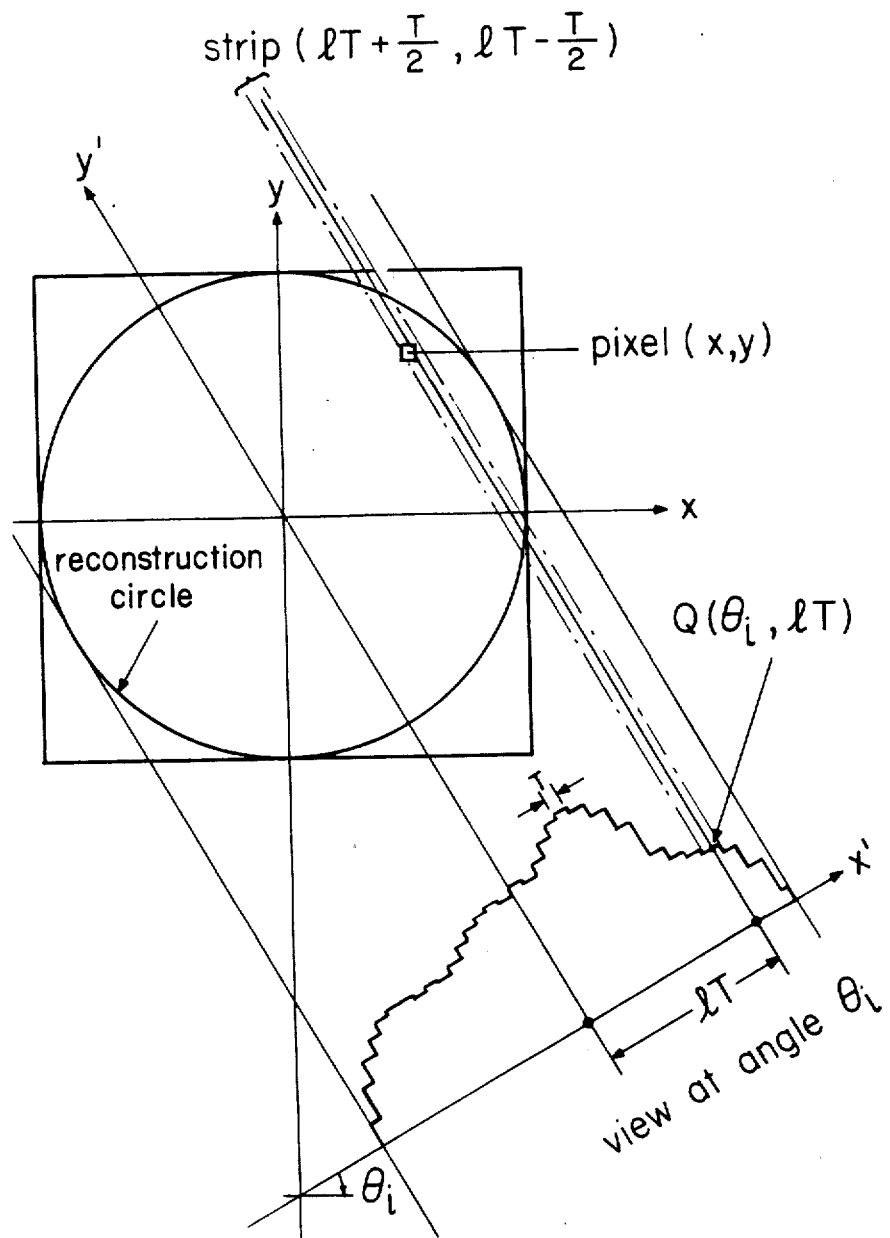

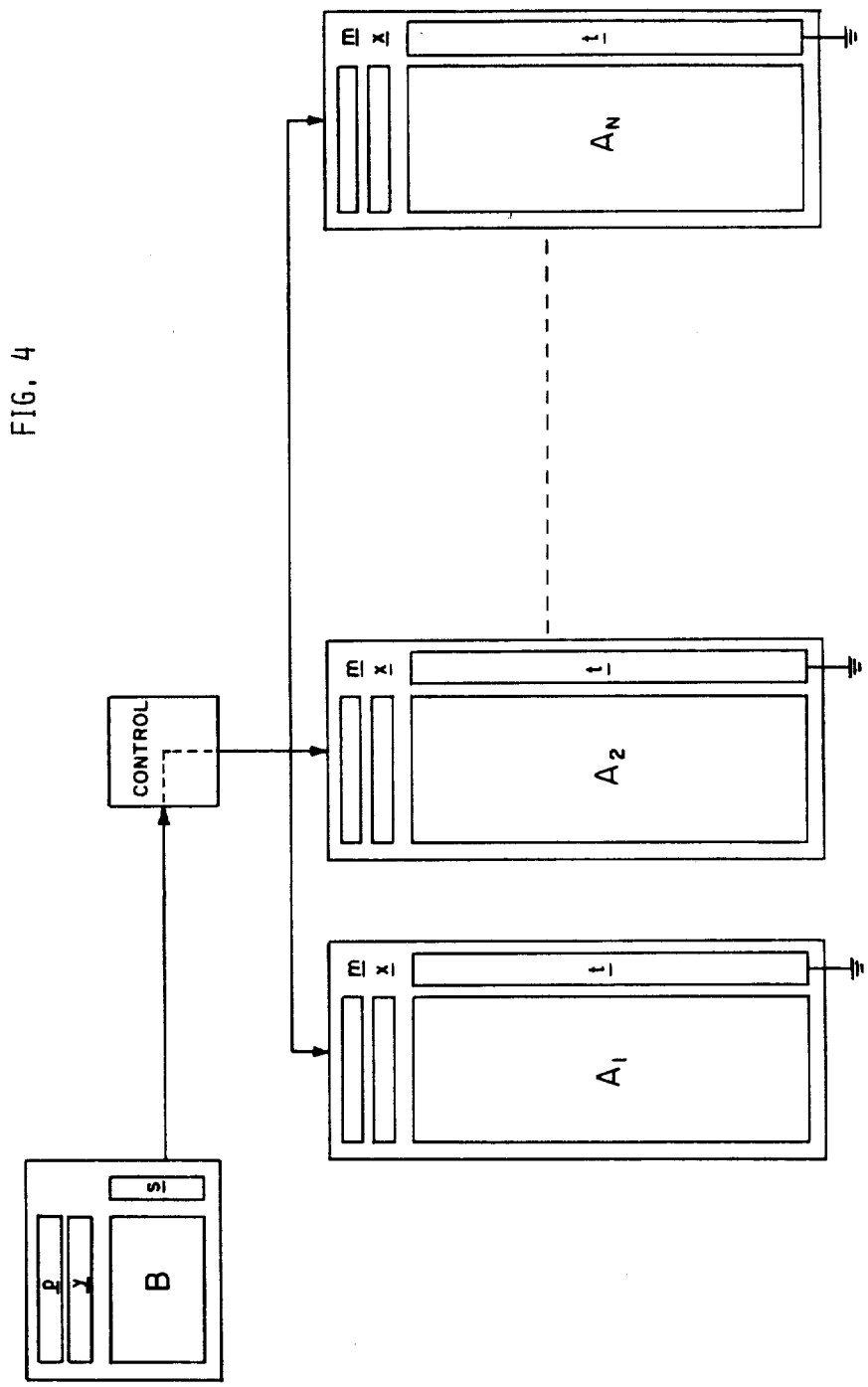

4,491,932

ASSOCIATIVE PROCESSOR PARTICULARLY USEFUL FOR TOMOGRAPHIC IMAGE RECONSTRUCTION

CROSS REFERENCE TO RELATED APPLICATION

The present application is related to our copending application Ser. No. 307,664, filed Oct. 1, 1981, now U.S. Pat. No. 4,404,653 issued Sept. 13, 1983, for Associative Memory Cell and Memory Unit Including Same, which patent is assigned to the same assignee as the present application.

BACKGROUND OF THE INVENTION

The present invention relates to the organization, construction and sequencing of associative processors embodying a fully parallel associative memory. An associative memory is a device wherein stored data words are identified according to their contents, hence it is sometimes called a content addressable memory. Such a memory is to be distinguished from the more widely used coordinate addressable memories, such as the Random Access Memory (RAM), in which stored data are accessed by their location or address. An associative memory accepts as input a comparand (or operand) word and a mask word, searches all stored data locations simultaneously for a match between the unmasked bits of the comparand and all the stored words, and identifies matching data words by setting a marker or tag in a TAG register.

Processors using associative memory were expected to be particularly effective in the solution of complex problems, such as image and radar-data processing, which require many involved operations on a large body of data, achieving their effectiveness and high speed by virtue of parallel operation on all data locations simultaneously. However, associative processors never realized their full potential partly because their associative memory was not implemented as a fully parallel, high density, integrated device, but was emulated using standard RAM circuits. Emulaton slowed down memory operation by forcing it to be bit serial and by moving comparison logic off-chip. An even more serious limitation to their speed and effectiveness is the fact that associative processors often operate on a rather small subset of the stored data due to lack of a common operand.

SUMMARY OF THE INVENTION

In our copending application, Ser. No. 307,664, filed Oct. 1, 1981, now U.S. Pat. No. 4,404,653 issued Sept. 13, 1983 there is described a means of implementing a parallel, high density, integrated, associative memory device. Such a device would directly enhance the speed capacity (as well as lower the cost) of conventional associative processors. But more significantly, it makes possible a new multi-operand associative processing method which intensifies some otherwise sparse operations, and thereby speeds it up by one to two orders of magnitude. A multi-operand associative processor constructed in accordance with this invention, uses a flag field in its memory to effectively or logically partition the memory into a number of disjoint data sets, and to execute the same operation in all data sets simultaneously but using a different operand on each data set. Stated another way, this is a method of partitioning the associative memory into a dynamically reconfigurable array of associative processors concurrently performing the same function with different operands on disjoint data sets.

Thus one object of this invention is to improve the speed and lower the cost of associative processors. In addition, and more specifically, it is the object of this invention to improve the speed and lower the cost of tomographic image reconstruction processors. This is a particular challenge because these improvements are necessary to make commercially feasible the dynamic imaging in three dimensions of moving organs such as the heart and lungs. It will be shown that a multi-operand tomographic processor can speed up back projection by a factor equal to one half the flag field length provided. In other instructions, such as multiplication by a constant (which is different for each data set), the speed up only equals one half of $\log_2 R$, where R is the length of the flag field. Finally, convolution is enhanced by a data shift based on the SHIFTAG memory operation.

According to a broad aspect of the invention, there is provided a multi-operand associative processor comprising: a main associative memory having a capability of comparing all bits and all words at the same time, and including storage elements constituting: (i) a storage array for storing a plurality of words, each including a plural-bit data field and a plural, R-bit flag field, which flag field is capable of grouping stored words into a plurality, up to "R", of disjoint-data sets by labeling the respective bit positions of the flag field; (ii) a MASK-register of equal word length and having corresponding fields for specifying the bit positions to be associated; (iii) a COMPARAND-register of equal word length and having corresponding fields for storing the bit patterns to be compared against; and (iv) a TAG-register having a storage element for each word for tagging the words in the storage array which have the specified pattern in the specified bits to be associated. The processor further includes an auxiliary memory having R-operand registers and a capability of selectively reading out either a bit-slice or its complement at a time; and control means programmed to gate the read-out of the auxiliary memory into the flag field of the MASK-register of the main memory to apply, in a bit-sequential manner, up to "R" operands from the auxiliary memory simultaneously, each to its respective disjoint-data set in the main memory, for simultaneously processing all the disjoint data sets of the main memory by the operands in the auxiliary memory.

Preferably, as described, the control means are programmed to effect the processing in two stages for each operand bit position, one stage being effected simultaneously on all the disjoint-data sets belonging to operands having a "0" in the respective bit position, and the other stage being effected simultaneously on all the disjoint-data sets belonging to operands having a "1" in the respective bit position.

More particularly, the control means are programmed to select the disjoint-data sets belonging to operands with "0" in the current bit position by comparing to "0" the flag field in the main memory masked by the current bit slice from the auxiliary memory, and to select the disjoint-data sets belonging to operands with a "1" in the current bit position by comparing to "0" the flag field in the main memory masked by the complement of the current bit slice from the auxiliary memory.

Particularly advantageous results are obtainable when the auxiliary memory is an association memory including a TAG-register, in which case the read-out of the auxiliary memory is from its TAG-register which outputs a bit-slice by a comparison to "1", and the complement of the bit-slice by a comparison to "0".

The processor of the present invention may also be used for speeding up multiplication of a plural-element vector constituting the multipliers, by a common constant constituting the multiplicand. In this case, the vector elements are stored in the data field of successive words of the main memory, and multiplication is executed in a plurality of iterations during each of which "i" bits of each multiplier are handled at a time, "i" being greater than "1" and $2^i$ being no greater than "R". The first $2^i$ multiples starting from zero of the common constant multiplicand are stored in the auxiliary memory, and the control means are programmed during each iteration: to decode the current "i" bits of the vector into the flag field of the main memory thereby grouping the vector elements into $2^i$ disjoint-data sets; and to perform a multi-operand ACCUMULATE operation simultaneously into the product field of the words in the main memory, the multiples added into each word depending on the flag field position set, or the decoded value, of the current group of "i" multiplier bits, the addition into the product field at each iteration starting "i" positions further to the left.

The processor may also be extended to cover a limited sum of products ax+by as in coordinate rotation, wherein: "a" and "b" are common multiplying factors, and "x" and "y" are multiplier vectors whose elements sit side-by-side in different data fields of each word in the main memory; "i" bits per multiplier are handled at one time; the "R" operands stored in auxiliary memory are the multiples 0, b, 2b, 3b, a, a+b, a+2b, a+3b, 2a, 2a+b, - - - 3a+3b of the common constant multiplicands; and at each iteration, the aggregate code made up of "i" bits per multiplier is decoded into the flag field of the main memory.

A particularly advantageous application of the processor of the present invention is to, perform tomographic back-projection for image reconstruction from a plurality of views taken at different angles. In this application, the main associative memory would have as many words as there are pixels in the image to be reconstructed, each word including the x-y coordinates of its pixel, the value-density of all pixels being initially set to zero. For each view taken at angle θ, a coordinate rotation would be performed to obtain the new x-coordinate, denoted by x', and the rotated origin would be shifted to coincide with the beginning of the first projection. A consecutive group of R rays would be handled at a time, the ray number and density measurement being placed side-by-side in the auxiliary memory. The pixels lying along each of the R rays would be selected and labeled in the flag field of the main memory of a "many-to-many" associative compare of $\log_2 R$ bits of x' against the ray number in the auxiliary memory, all density measurements from the auxiliary memory acting simultaneously, each on the pixels lying along its ray, using a multi-operand ACCUMULATE operation into the density field of the main memory, the process being repeated for all groups in a view. The process would be repeated for all views to thereby reconstruct the image in the main memory.

Further features and advantages of the invention will be apparent from the description below.

BRIEF DESCRIPTION OF THE DRAWINGS

The invention is herein described, by way of example only, with reference to the accompanying drawings, wherein:

FIG. 2 illustrates one form of multi-operand associated processor constructed in accordance with the present invention and including two basic associative memories each according to FIG. 1;

FIG. 3 is a tomographic back-projection diagram helpful in explaining the use of the associative processor of the present invention in tomographic image reconstruction; and FIG. 4 is a block diagram illustrating one memory organization of the associative processor of the present invention for tomographic convolution.

DESCRIPTION OF A PREFERRED EMBODIMENT

Figure 1:
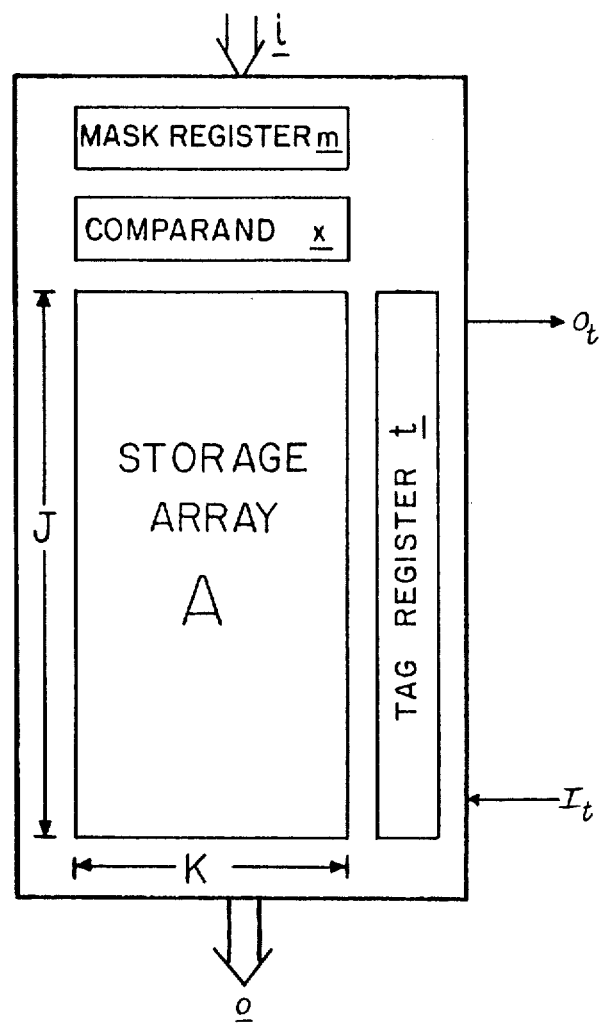
FIG. 1 is a block diagram illustrating a basic associative memory used in the associative processor of the present invention.

FIG. 1 illustrates a basic associative memory unit similar to that described in the above-cited copending patent application Ser. No. 307,664. Briefly, such a unit consists of a plurality of words each consisting of a plurality of basic bit cells. The words are disposed in a plurality of horizontal rows (J) within the Storage Array A, and the bits are disposed in a plurality of vertical columns (K) within the storage Array A. For example, the memory unit of FIG. 1 may include 4096 words (J) each of 32 bits (K) in length, or a total of 128,000 bits.

Each cell within the Storage Array A has associated with it a TAG-bit. The collection of these TAG-bits is found in the TAG-register t, sometimes referred to as the response store, organized as a SHIFT-register. During SHIFT, It serves as the input into the first stage, and Ot serves as the output from the last stage.

The basic associative memory unit illustrated in FIG. 1 further includes a MASK-register m and a COMPARAND-register x, both controlled by a central control unit within the computer. When performing a simple search of all the cells within the Storage Array A, the MASK-register m is used to specify the bits of the word to be compared, and the COMPARAND-register x is used to specify the pattern to be compared. For example, if only the first ten bits of a 32-bit word are to be compared with the pattern specified in the COMPARAND-register x, the MASK-register m would include a "one" for each of the first ten bits (which are to be compared), and a "zero" for each of the remaining bits.

When a SET-command is received, this causes all the TAG-bits within the TAG-register t to be set to "one". When the central control unit issues a COMPARE-command, any word containing at least one bit which does not match the unmasked bits (as specified in the MASK-register m) of the COMPARAND (as specified in the COMPARAND-register x) will cause the respective TAG-bit to be reset to "zero". Thus, after a COMPARE-command, only those cells whose unmasked bits correspond to the COMPARAND will be left with their TAG-bits set to "zero".

More particularly, the basic association memory illustrated in FIG. 1 is defined to have the following operations;

For all j=0, 1, ..., J−1 and all k=0, 1, ..., K−1

| 1. SETAG | $t_j \leftarrow 1$ |
|---|---|
| 2. SHIFTAG | $t_j \leftarrow t_{j+1}, t_j \leftarrow 1_t, 0_t \leftarrow t_0$ |
| 3. LOAD x | $x_k \leftarrow 0, x_k \leftarrow 1,$ or $x_k \leftarrow i_k$ |
| 4. LOAD m | $m_k \leftarrow 0, m_k \leftarrow 1,$ or $m_k \leftarrow i_k$ |
| 5. COMPARE | $t_j \leftarrow t_j \overline{\sum_k m_k (a_{jk} \oplus x_k)}$ |
| 6. WRITE | $a_{jk} \leftarrow \bar{t}_j a_{jk} + t_j (m_k x_k + \bar{m}_k a_{jk})$ |
| 7. READ | $o_k \leftarrow \sum_j (a_{jk}) t_j$ |

The symbols $+$, $\oplus$ and $\Sigma$ stand for OR, Exclusive-OR, and OR expansion respectively. $\bar{m}$ denotes the complement of m. Both WRITE and COMPARE operate just on masked ON bits ($m_k = 1$) of words (rows) that are tagged ($t_j = 1$). Hence the SETAG operation is required initially to make all words eligible for processing. Up to four operations may be done concurrently during a given memory cycle:

(1)SETAG or SHIFTAG, (2)LOAD x, (3)LOAD m, and (4)COMPARE, WRITE or READ.

Clearly, any subset of the above may also be concurrent, and when registers x and m are loaded from the input bus simultaneously, they must receive the same data.

FIG. 2 illustrates a multi-operand associative processor constructed in accordance with the present invention. MAIN associative memory, A holds the data to be processed and an R-bit flag field. OPERAND associative memory, B, stores R operands of word-length N equal to (or less than) the data field of MAIN memory. The words in MAIN memory are grouped into R disjoint data sets, one corresponding to each of the R operands, by labeling each word in its flag field with the data set to which it belongs. Labeling is effected by setting a ONE into the appropriate position of the flag field, and resetting the other flag positions to ZERO. Thus a ONE in bit i of the flag field (bit N+i+2 of the word) marks the word as belonging to data set i, corresponding to operand i. Words not belonging to any data set have their candidate mark set to ONE, and do not participate in the operation. Referring again to FIG. 2, a means is provided for selectively gating the output of the OPERAND memory TAG-register into the flag field of the MAIN memory MASK-register, enabling $m_{N+i}$ to receive $s_i$.

A multi-operand associative instruction is defined as an operation in which all operands act simultaneously, each on its own distinct data set. By way of an example it will now be shown how the processor executes and ACCUMULATE instruction which calls for each operand to be added into the data field of all words belonging to its corresponding data set. The instruction is performed bit-serially, the operands examined a bit-slice at a time, and their corresponding data sets processed in two groups: (a) data sets corresponding to operands whose current bit is ZERO and (b) data sets corresponding to operands whose current bit is ONE. The two groups are handled sequentially, the data sets in each group being processed simultaneously.

The full algorithm is given in Table 1, where d(f,g,h) denotes a binary vector that is ZERO everywhere except in bit positions f, g and h. The truth table for serial addition into an accumulator, shown in Table 2, lists four cases requiring action, and gives a valid order for their execution. The word format in MAIN memory is shown below:

| $a_{N+R}$ | | | | | MS | LS |
|---|---|---|---|---|---|---|
| $a_{K-1}$ | $a_{N+2}$ | $a_{N+1}$ | $a_N$ | $a_{N-1}$ | | $a_0$ |
| R-bit flag | | cand. mark | Carry | | N-bit number | |

It assigns bit N to store the sequential carry, which is set to ZERO initially (step 0 of algorithm). Steps 1 to 5 operate on data sets belonging to operands whose current bit is ZERO. The current bit-slice in OPERAND memory B is obtained by executing a COMPARE to ONE (step 0 or step 10), and is applied as a mask to the flag field of MAIN memory A (step 2). A COMPARE against ZERO in A (step 2 and step 4) will then select only cells whose flags correspond to operands with a ZERO in the current bit position. Similarly, steps 6 to 10 operate on data sets belonging to operands whose current bit is ONE. After repeating steps 1 to 10 for each operand bit, the process is complete and each operand has been added to its corresponding data set. It should be noted that this algorithm requires a multi-bit COMPARE to achieve any speed-up, but also takes advantage of a multi-bit WRITE. With the fully parallel associative memory assumed here, it executes in $10N + 1$ memory cycles. Some further reduction may be achieved in the number of memory cycles to execute a multi-operand associative instruction by expanding the operation repertoire of the associative memory which was deliberately kept basic to simplify this description.

FIG. 2 schematically illustrates the control unit which is necessary to sequence the processing steps of the multi-operand associative processor, and may include an instruction store. Finally, OPERAND memory was described as being associative, but it can obviously take other forms, such as a set of shift registers with parallel entry, and TRUE and FALSE serial output.

TABLE 1

| | | Multi-operand ACCUMULATE Instruction | |
|---|---|---|---|
| STEP | MEMORY A | MEMORY B | CONTROL |
| 0 | $x \leftarrow 0; m \leftarrow d(N);$ SETAG;WRITE | $y,p \leftarrow d(0);$ SETAG;COMPARE | CNT $\leftarrow 0$ |
| 1 | $x \leftarrow d(N);$SETAG | | |

TABLE 1-continued

Multi-operand ACCUMULATE Instruction

| STEP | MEMORY A | MEMORY B | CONTROL |
|---|---|---|---|
| 2 | m ← d(CNT,N,N+1)+s*d(N+2,N+3,...,N+R+1); COMPARE | | |
| 3 | x ← d(CNT);WRITE | | |
| 4 | x ← d(N,CNT); SETAG;COMPARE | | |
| 5 | x ← d(N);WRITE | y ← 0; SETAG;COMPARE | |
| 6 | x ← d(CNT);SETAG | | |
| 7 | m ← d(CNT,N+1)+s*d(N+2,N+3,...,N+R+1); COMPARE | | |
| 8 | x ← d(N);WRITE | | |
| 9 | x ← 0;SETAG;COMPARE | | |
| 10 | x ← d(CNT);WRITE | y,p ← d(CNT+1); SETAG;COMPARE | CNT=CNT+1 if CNT<N return to step 1 |

It will thus be seen from the above Table 1 that every step of the program consists of a basic associative operation executed in main memory A and a generally different operation (or no operation) performed simultaneously in operand memory B. In the last column of Table 1, labeled CONTROL, are entered special actions of the control unit, such as clearing, incrementing and testing bit count CNT, or branching on condition. The control action at any step is simultaneous with the basic operations taking place in memories A and B. The LOAD X, Load m operations are expressed in terms of a binary vector d defined above. As an example we take the LOAD m instruction in Step 2 of Table 1, m←d (CNT, N, N+1)+s*d (N+2, N+3, ..., N+R+1), evaluate it with reference to the word format given above:

TABLE 2

ACCUMULATE Truth Table

| | IN | | OUT | | Order of |
|---|---|---|---|---|---|
| Addend | Carry | $a_{CNT}$ | Carry | $a_{CNT}$ | Execution |
| 0 | 0 | 0 | 0 | 0 | — |
| 0 | 0 | 1 | 0 | 1 | — |
| 0 | 1 | 0 | 0 | 1 | 1 |
| 0 | 1 | 1 | 1 | 0 | 2 |
| 1 | 0 | 0 | 0 | 1 | 4 |
| 1 | 0 | 1 | 1 | 0 | 3 |
| 1 | 1 | 0 | 1 | 0 | — |
| 1 | 1 | 1 | 1 | 1 | — |

PROCESSOR FOR TOMOGRAPHIC IMAGE RECONSTRUCTION

| | | | | | | | | |
|---|---|---|---|---|---|---|---|---|
| d (N+2, N+3, ..., N+R+1) | 1 | 1 | ... | 1 1 0000 | ... | 000 | ... | 00 | gating s into flag field of m |
| s | $s_R - 1 s_r - 2$ | ... | $s_1 s_0$xxxx | ... | xxx | ... | xx | |
| s*d (N+2, ..., N+R+1) | $s_R - 1 s_R - 2$ | ... | $s_1 s_0$0000 | ... | 000 | ... | 00 | setting other bits of m |
| + | | | | | | | | |
| d (CNT, N, N+1) | 0 | 0 | ... | 0 0 1100 | ... | 010 | ... | 00 | |
| m | $s_R - 1 s_R - 2$ | ... | $s_1 s_0$1100 | ... | 010 | ... | 00 | |

It will be noted that the d ( ) functions take on the length of m, the vector whose value is being assigned; s is guided to the flag field (bit positions N+2, N+3, ..., N+R+1) with other bit positions free to take on any arbitrary value (denoted by x); the symbol "*" denotes the bitwise logical AND function; and the symbol "+" between vectors denotes the bitwise logical OR function.

While multi-operand associative processing was found to be effective in many areas, its power will be demonstrated in tomographic image reconstruction by the well known convolution-back-projection method.

$$f(x,y) = (\pi/V) \sum_{i=1}^{V} Q(\theta_i, lT) \quad (1)$$

$$Q(\theta_i, lT) = T \sum_{k} P(\theta_i, kT) * h(lT - kT) \quad (2)$$

where $IT = x \cos \theta_i + y \sin \theta_i$, $P(\theta_i, kT)$ is the $k^{th}$ projection (ray) at angle $\theta_i$, h (IT) is the kernel function, T is the sampling interval, V is the number of views, and f (x,y) is the density function of the image to be reconstructed.

Implementation of the back-projection process, given by equation (1) above, will be discussed first, assuming that the data has been convolved or filtered, and $Q(\theta_i, IT)$ is available. FIG. 3 illustrates the back-projection process. The image to be reconstructed is partitioned into a square array of pixels. For a given view at angle $\theta_i$, we consider each projection or ray, determine what pixels lie along its path, and add in to them the density contribution of the ray. This process must be repeated for all views to obtain the reconstructed image. A multi-operand associative processor, such as was described in the previous section and illustrated in FIG. 2, may be used to implement back-projection in three phases. The word format in MAIN memory, appears below. The field length numbers given correspond to a tomographic system in which 360 views × 512 projections are reconstructed into a 256 × 256 pixel image.

| R | F | F | F+G+1 | | N |
|---|---|---|-------|---|---|
| flag | x | y | ax + by | | density |
| 32 | 8 | 8 | 20 | 1 | 25 |

PHASE 1—COORDINATE ROTATION

In order to identify the picture elements (pixels) affected by each projection $P(\theta_i, IT)$, it is necessary to refer the pixel coordinates (x,y) to the reference frame of the projection, which is rotated by an angle of $\theta_i$. Actually, we only need the new abscissa, $$x' = x \cos \theta_i + y \sin \theta_i$$

Evaluation of this expression is performed by repeated application of the multi-operand ACCUMULATE algorithm detailed in the previous section. Let $a = \cos \theta_i$ and $b = \sin \theta_i$, using the binary expansion of x and y, $$ax + by = \sum_k (ax_k + by_k)2^k.$$

If two bits of x and y are handled at each interation, we must consider 16 linear combinations of a and b, $$0, b, 2b, 3b, a, a+b, a+2b, a+3b, 2a, 2a+b, \ldots, 3a+3b.$$

These combinations are precomputed and placed in OPERAND memory B. At each iteration, the flag field of each cell in A is marked according to the value of $x_{k+1}x_ky_{k+1}y_k$, and an ACCUMULATE instruction performed. The partial result bit-position at which addition starts is incremented by 2 every iteration. It is easily verified that the number of cycles required to execute this computation is, $$16F + 5F(G+3)$$

where F and G denote the wordlengths of x and a respectively.

PHASE 2—PARTITIONING OF PIXELS FOR A NUMBER OF RAYS

Having computed the new abscissa x' of all pixels for the angle of rotation $\theta_i$ of a given view, we are now ready to identify and label the pixels affected by each ray. Since labeling requires a flag bit per ray, to maintain a reasonable word length in main memory, pixel partitioning is performed for a group of (up to 32) rays at a time. If a pixel is affected by the ray to which it is closest, the partition of the $l^{th}$ ray is determined by a search between limits, $$T(l-\tfrac{1}{2}) \leq x \cos \theta_i + y \sin \theta_i < T(l+\tfrac{1}{2})$$

To simplify computation the rays grouped for concurrent processing are taken in their natural order, the number of rays per group is chosen to be a power of 2, and the rotated origin is shifted to coincide with the begining of the first projection. Pixel partitioning then reduces to an operation known in the literature, for example as illustrated in Digbie U.S. Pat. No. 3,771,139, as many-to-many associative compare on k bits, where $2^k$ is the number of rays per group. The algorithm for this operation is illustrated in Table 3, where L is the number of bits to be compared (L=log$_2$ p, p=number of projections/view), $e_c$ are the upper bits common to the entire group, and $E_c$ is the number of bits in $e_c$ ($E_c$=log$_2$ g, for g groups of rays). Execution time in memory cycles will be given by,

TABLE 3

| | Many-to-many Associative Compare | | |
|---|---|---|---|
| STEP | MEMORY A | MEMORY B | CONTROL |
| 1 | m ← d(L,L+1, ... , L+R);SETAG | | |
| 2 | x ← $e_c$*d(L−$E_c$,L−$E_c$+1, ... , L−1); WRITE | | |
| 3 | x ← d(L−$E_c$,L−$E_c$+1, ... , L+R); SETAG;COMPARE | | CNT ← 0 |
| 4 | x,m ← d(L,L+1, ... , L+R); WRITE | y ← 0,p ← d(CNT) SETAG;COMPARE | |
| 5 | x,m ← d(L,CNT); SETAG,COMPARE | | |

TABLE 3-continued

Many-to-many Associative Compare

| | | | |
|---|---|---|---|
| 6 | m ← s*d(L+1,L+2, ..., L+R); WRITE | | |
| 7 | m ← d(L,CNT);SETAG | y ← d(CNT); SETAG;COMPARE | |
| 8 | x ← d(L);COMPARE | | CNT=CNT+1 |
| 9 | m ← s*d(L+1,L+2, ..., L+R); WRITE | y ← 0,p ← d(CNT); SETAG;COMPARE | If CNT<L−$E_c$ GOTO 5 |
| 10 | x ← 0;m ← d(L+1, ..., L+R); SETAG;COMPARE | | |
| 11 | x ← d(L,L+1, ..., L+R);WRITE | | |

$a_{L+R}$   $a_{L+1}$   $a_L$   $a_{L-1}$   $a_0$
R-bit flag   Auxiliary Flag   L-bit number $6 + 5(L - E_c) = 6 + 5k$ It should be noted that by rearranging the word format in MAIN memory so that the flag field is just to the right of ax+by, the latter field may be reduced to a length of $1 + \log_2 p$ or 10 bits for our example.

PHASE 3—MULTIPLE RAY BACK PROJECTION

Here the density function f(x,y) is finally computed, by adding the contribution of each ray to the pixels it strikes. Having partitioned the pixels into many disjoint sets each belonging to one of the rays to be processed simultaneously, the back projection may now be executed by the multi-operand ACCUMULATE algorithm described in the previous section. Execution time is independent of the number of operands, hence it is tempting to maximize the number of rays handled concurrently. But a flag bit per ray is required to label cells in MAIN memory, so a compromise value must be chosen to keep the word length within reason.

Execution time

The time to perform a basic back projection will now be estimated for the reconstruction of a 256×256 pixel image from 360 views of 512 projections each.
- Phase 1: Coordinates and sin/cos are 8-bit and 11-bit precision respectively (F=8, G=11). 16F+5F(G+3)=688 cycles/view.
- Phase 2: View processed in 16 groups of 32 rays, K=5, 6+5K=31 cycles/group. For 16 groups, 496 cycles/view.
- Phase 3: Projections measured to 16 bits, accumulated to 25 bits over 360 views. Hence N=25, 16(10N+1)=4016 cycles/view.

This gives a total of 5190 cycles/view or about 1900000 cycles overall. For an associative memory with a cycle time of 100 nanoseconds an image would be back-projected in 0.19 seconds.

The major hardware requirement for the back projector is the MAIN associative memory whose size is 65536 words×94 bits. If the ax+by and flag fields are overlapped as indicated earlier, the memory reduces to 65536×84 bits.

A variation on this solution to the back projection problem should now be mentioned. Since the geometry of the tomographic system remains fixed, the pixels lying along each ray can be remembered in an auxiliary memory, and the flag field loaded as needed for the back projection proper. This saves the ax+by field, reducing MAIN memory word length to 74 bits. In execution time, it saves the coordinate rotation phase, and replaces pixel partitioning with flag loading in the second phase.

We turn now to the convolution or filtering of the original data to obtain $Q(\theta_i, lT)$.

CONVOLUTION ALGORITHM

Let $h = [h_i]$ and $p = [p_i]$ be two m-element vectors. The discrete convolution of h and p is defined by:

$$(h*p)_k = \sum_j h_j p_{k-j}$$

where $k = 0, 1, \ldots, 2(m-1)$. Or in matrix form, $$\begin{bmatrix} h_0 & 0 & \ldots & 0 \\ h_1 & h_0 & \ldots & 0 \\ \vdots & & & \vdots \\ h_{m-1} & & \ldots & h_0 \\ 0 & h_{m-1} & \ldots & h_1 \\ \vdots & & & \vdots \\ 0 & 0 & \ldots & h_{m-1} \end{bmatrix} \begin{bmatrix} p_0 \\ p_1 \\ \vdots \\ p_{m-1} \end{bmatrix}$$

Note that every element of p is multiplied by every element of h. The resulting products are added up to form the convolution vector whose k-th element is the sum of all $h_i p_j$ such that $i+j=k$. This operation can be performed in a multi-operand associative processor using the algorithm described below.

Assume memory A is m words long and that each word has the following format:

word j | flags | T | CY | P | PF | where
- flags: a 16-bit field used for partitioning the memory
- T,CY: two 1-bit fields for temporary storage
- P: an n-bit field holding element j of vector p
- PF: a $2n + \log_2 m$ field for partial and final results The idea is to multiply in parallel all $P_j$'s by the elements of h taken in succession. The multi-operand approach is used to speed-up multiplication by handling 4 bits of the multiplier ($P_j$) at a time, and the partial products are summed into the PF field. After each multiplication, all PF fields are shifted up so that $PF_j \leftarrow PF_{j+1}$. Element k of the convolution vector, where $k < m-1$, will be available bit-serially from the top of the TAG register during the k-th shifting, or may be saved in parallel by a READ instruction right after phase 6. The remaining m elements are left in the PF fields after the last iteration.

Referring to Table 4, phases 1 and 2 initialize the outer loop and inner loop counters respectively. Phases 3 to 6 perform the actual multiply-and-add stage in a manner similar to the one used for coordinate rotation. Memory A is partitioned into 16 distinct subsets by decoding the current 4-bit group of the multiplier ($P_j$), and labeling each word in its flag field. At the same time, precomputed values of $h_{EC}$ are stored in memory B. Using multi-operand ACCUMULATE, each of the multiples is then summed to its corresponding subset of PF fields in memory A. The bit position at which the addition starts is incremented by 4 at each iteration. As $2n + \log_2 m$ bits need to be accumulated to obtain full precision, phase 5 takes care of propagating the carry generated by the previous phases up through the current most significant bit. Phase 7 shifts up the partial results. Tables 5 and 6 show the detailed routines to perform carry propagation and field shifting respectively. It should be noted that SETAG is here abbreviated to SET and that the shift-fields routine makes good use of the SHIFTAG operation.

TABLE 4

| PHASE | OPERATION |
|---|---|
| 1 | Initialize element count to zero  EC $\leftarrow$ 0. |
| 2 | Initialize bit-group count  BG $\leftarrow$ 0. |
| 3 | Partition memory A according to bit group BG of fields P and load $0h_{EC}, 1h_{EC}, \ldots, 15h_{EC}$ in memory B. |
| 4 | Perform a multi-operand ACCUMULATE from memory B into the PF fields of memory A starting at bit position 4BG. |
| 5 | Propagate resulting carry through bit position $2n + \log_2 EC$. |
| 6 | Increment BG and if $4BG < n$ go to 3, else continue. |
| 7 | Shift the PF fields so that $PF_j \leftarrow PF_{j+1}$ |
| 8 | Increment EC and if $EC < m$ go to 2, else exit. |

EXECUTION TIME FOR THE CONVOLUTION ALGORITHM

From Tables 5 and 6 and from the results given earlier for multiplication speed-up using multi-operand addition, the following figures can be obtained for each iteration (EC) of the major loop in Table 4.

Phase 3; $32n/4$ memory cycles.

Phase 4; $10(n+4)n/4$ memory cycles.
Phase 5; $5(n/4)[\log_2 (EC) + (n/2) - 2]$ memory cycles.
Phase 7; $5[2n + \log_2 (EC)]$ memory cycles.

TABLE 5

CARRY PROPAGATION.
SB = starting bit position, SF = final bit position.

| STEP | OPERATION |
|---|---|
| 0 | BCT $\leftarrow$ 0 |
| 1 | m $\leftarrow$ d(SB+BCT,CY);SET |
| 2 | x $\leftarrow$ d(CY);COMPARE |
| 3 | x $\leftarrow$ d(SB+BCT);WRITE |
| 4 | x $\leftarrow$ d(SB+BCT,CY);SET;COMPARE |
| 5 | x $\leftarrow$ d(CY);WRITE |
| 6 | BCT $\leftarrow$ BCT+1; if SB+BCT<SF go to 1, else exit |

TABLE 6

SHIFT FIELDS.
SB = first bit of field to be shifted, N = number of bits to be shifted.

| STEP | OPERATION |
|---|---|
| 0 | BCT $\leftarrow$ 0 |
| 1 | x $\leftarrow$ 0,m $\leftarrow$ d(T);SET;WRITE |
| 2 | x,m $\leftarrow$ d(SB+BCT);COMPARE |
| 3 | x,m $\leftarrow$ d(SB+BCT,T);SHIFTAG;WRITE |
| 4 | x $\leftarrow$ 0,m $\leftarrow$ d(T);SET;COMPARE |
| 5 | m $\leftarrow$ d(SB+BCT);WRITE |
| 6 | BCT $\leftarrow$ BCT+1; if BCT<N go to 1, else exit |

The loop is executed m times, so that the total number of memory cycles for completion is given by:

$$T = (25/8)mn^2 + (51/2)mn + 5((n/4) + 1) \sum_{EC=1}^{m} \log_2(EC)$$

As an example, consider the convolution of two 512-element vectors (m=512) where each element is given with a precision n of 16 bits. Taking $m \log_2 m$ as an upper bound for $\Sigma \log_2 m$ in the above equation, 102 3 elements of the convolution vector will be generated in 73 msec assuming a memory cycle of 100 nsec.

We now consider how to integrate the convolution and back projection processes into a tomographic processor. Since the possibilities are too many to deal with, only two limiting cases will be mentioned.

FIG. 4 illustrates an arrangement wherein a single associative processor is used to do both functions sequentially, first the convolution and then the back projection. For the example chosen, MAIN associative memory would be organized in 128 blocks each 512 words × 84 bits as illustrated in FIG. 4. The 360 views could then be filtered in 3 groups of 120, each taking 73 milliseconds, for a total convolution time of 0.22 seconds. The total processing time then becomes 0.41 seconds.

If higher speed is required, separate processors can be devoted to convolution and back projection, the two processors being connected in tandem and operated as a pipeline. Convolver MAIN memory is now given as many memory blocks as needed to keep pace with the back projector, and a word-length fulfilling its own requirements. For our example the number of memory blocks is still 128 and the word length 75 bits.

The control as shown in FIGS. 2 and 4 of the drawings may use commercially available components, and the programs to perform the described operations, are set forth, in Tables 1, 3, 4, 5, and 6. For example, reference may be made to the following publications, each of which includes a broad bibliography:
1. Bit Sliced Microprocessor Architecture, by N. A. Alexandridis, Computer, June 1978, pp 56–80
2. Microprogramming: A Tutorial and Survey of Recent Developments, by T. G. Rauscher and P. M. Adams, IEEE Trans. on Comp., Vol. C-29, No. 1, January 1980, pp 2–20
3. Microprogrammed Control for Specialized Processors, by E. E. Swartzlander, Jr., IEEE Trans. on Comp, Vol. C-28, No. 12, December 1979, pp 930–934.

In addition, suitable components are available as standard integrated circuits from a number of manufacturers. A partial listing and description of these components appear in the first two of the above-cited publications. The manner of assembling the components into the desired control unit is also described in commercially-available literature, for example in the brochure titled "Microprogramming Handbook" by John R. Mick and Jim Brick, copyright 1976 by Advanced Micro Devices, Inc., which material was also expanded into the book Bit-Slice Microprocessor Design, by J. Mick and J. Brick, McGraw-Hill 1980. Accordingly, further details of the specific construction of the hardware, or the specific programs for implementing the procedures described in the foregoing tables, are not deemed necessary herein.

What is claimed is:

1. A multi-operand associative processor comprising:
A. a main associative memory having a capability of comparing all bits and all words at the same time, and including storage elements constituting:
  (i) a storage array for storing a plurality of words, each including a plural-bit data field and a plural, R-bit flag field, which flag field is capable of grouping stored words into a plurality, up to "R", of disjoint-data sets by labeling the respective bit positions of the flag field;
  (ii) a MASK-register of equal word length and having corresponding fields for specifying the bit positions to be associated;
  (iii) a COMPARAND-register of equal word length and having corresponding fields for storing the bit patterns to be compared against; and
  (iv) a TAG-register having a storage element for each word for tagging the words in the storage array which have the specified pattern in the specified bits to be associated;
B. an auxiliary memory having R-operand registers and a capability of selectively reading out either a bit-slice or its complement at a time; and
C. control means programmed to gate the read-out of the auxiliary memory into the flag field of the MASK-register of the main memory to apply, in a bit-sequential manner, up to "R" operands from the auxiliary memory simultaneously, each to its respective disjoint-data set in the main memory, for simultaneously processing all the disjoint data sets of the main memory by the operands in the auxiliary memory.

2. The processor according to claim 1, wherein said control means are programmed to effect said processing in two stages for each operand bit position, one stage being effected simultaneously on all the disjoint-data sets belonging to operands having a "0" in the respective bit position, and the other stage being effected simultaneously on all the disjoint-data sets belonging to operands having a "1" in the respective bit position.

3. The processor according to claim 1, wherein said control means are programmed to select the disjoint-data sets belonging to operands with "0" in the current bit position by comparing to "0" the flag field in the main memory masked by the current bit slice from the auxiliary memory, and to select the disjoint-data sets belonging to operands with a "1" in the current bit position by comparing to "0" the flag field in the main memory masked by the complement of the current bit slice from the auxiliary memory.

4. The processor according to claim 1, wherein said auxiliary memory is an associative memory including a TAG-register, the read-out of the auxiliary memory being from its TAG-register which outputs a bit-slice by a comparison to "1", and the complement of the bit-slice by a comparison to "0".

5. The processor according to claim 1, wherein the main memory is capable of shifting-up the contents of its TAG-register one position in a basic operation denoted as SHIFTAG, organized to convolve an m-element data vector p by an m-element filter vector h, to produce a $2m-1$ element vector hp, the p data field in the main memory being considered as the multiplier, the processor being operated through a plurality of major cycles wherein:
  during each major cycle, the following functions are performed in all words of the main memory simultaneously using successive elements of the vector h, starting with $h_0$: the p data field is multiplied by the current h element; the product is summed, one partial product at a time, into the hp field; and this field is shifted one word up via the TAG-register one bit-slice at a time;
  and also, during each major cycle, a successive element of hp starting with $hp_0$ becomes available and is retrieved either bit-serially from the TAG-register at the shift-up of each bit-slice, or in parallel by a READ operation, the other elements of hp, $hp_m \ldots hp_{2m-1}$, being in the main memory at the end of the processing.

6. A processor according to claim 1, organized to perform tomographic back-projection for image reconstruction from a plurality of views taken at different angles, wherein:
  the main associative memory has as many words as there are pixels in the image to be reconstructed, each word including the x-y coordinates of its pixel, the density of all pixels being initially set to zero;
  for each view taken at angle $\theta$, a coordinate rotation is performed to obtain the new x-coordinate, denoted by x', and the rotated origin is shifted to coincide with the beginning of the first projection;
  a consecutive group of R rays is handled at a time, the ray number and density measurement being placed side-by-side in the auxiliary memory, the pixels lying along each of the R rays being selected and labeled in the flag field of the main memory by a "many-to-many" associative compare of $\log_2 R$ bits of x' against the ray number in auxiliary memory, all density measurements from the auxiliary memory acting simultaneously, each on the pixels lying along its ray, using a multi-operand ACCUMULATE operation into the density field of the main memory, the process being repeated for all groups in a view; and the process is repeated for all views to thereby reconstruct the image in the main memory.

7. A processor according to claim 6, wherein the main memory is partitioned into blocks suitable for convolution, the processor executing convolution and back-projection operations sequentially.

8. The processor according to claim 1, programmed for speeding up multiplication of a plural-element vector constituting the multipliers, by a common constant constituting the multiplicand; wherein said control means are programmed:

to store the vector elements in the data field of successive words of the main memory, and to execute multiplication in a plurality of iterations during each of which "i" bits of each multiplier are handled one at a time, "i" being greater than "1" and $2^i$ being no greater than "R";

to store the first $2^i$ multiples starting from zero of the common constant multiplicand in the auxiliary memory; and during each iteration: to decode the current "i" bits of the vector into the flag field of the main memory thereby grouping the vector elements into $2^i$ disjoint-data sets; and to perform a multioperand ACCUMULATE operation simultaneously into the product field of the words in the main memory, the multiples added into each word depending on the flag field position set, or the decoded value, of the current group of "i" multiplier bits, the addition into the product field at each iteration starting "i" positions further to the left.

9. The processor according to claim 8, programmed to cover a limited sum of products $ax + by$, as in coordinate rotation, wherein:

"a" and "b" are common multiplying factors, and "x" and "y" are multiplier vectors whose elements sit side-by-side in different data fields of each word in the main memory;

"i" bits per multiplier are handled at one time;

the "R" operands stored in auxiliary memory are the multiples 0, b, 2b, 3b, a, a+b, a+2b, a+3b, 2a, 2a+b, ..., 3a+3b of the common constant multiplicands a and b; and at each iteration, the aggregate code made up of "i" bits per multiplier is decoded into the flag field of the main memory.

10. A tomographic image reconstruction system including a first processor in combination with a second processor;

said first processor being programmed as a convolution processor wherein said main associative memory is capable of shifting-up the contents of its TAG-register one position in a basic operation denoted as SHIFTAG, organized to convolve an m-element data vector p by an m-element filter vector h, to produce a $2m-1$ element vector hp, the p data field in the main memory being considered as the multiplier, the processor being operated through a plurality of major cycles wherein:

during each major cycle, the following functions are performed in all words of the main memory simultaneously using successive elements of the vector h, starting with $h_0$: the p data field is multiplied by the current h element; the product is summed, one partial product at a time, into the hp field; and this field is shifted one word up via the TAG-register one bit-slice at a time;

and also, during each major cycle, a successive element of hp starting with $hp_0$ becomes available and is retrieved either bit-serially from the TAG-register at the shift-up of each bit-slice, or in parallel by a READ operation, the other elements of hp, $hp_m \ldots hp_{2m-1}$, being in the main memory at the end of the processing;

said second processor being programmed to perform tomographic back-projection for image reconstruction from a plurality of views taken at different angles, wherein:

said main associative memory has as many words as there are pixels in the image to be reconstructed, each word including the x-y coordinates of its pixel, the density of all pixels being initially set to zero;

for each view taken at angle $\theta$, a coordinate rotation is performed to obtain the new x-coordinate, denoted by x', and the rotated origin is shifted to coincide with the beginning of the first projection;

a consecutive group of R rays is handled at a time, the ray number and density measurement being placed side by side in said auxiliary memory, the pixels lying along each of the R rays being selected and labeled in the flag field of the main memory by a "many-to-many" associative compare of $\log_2 R$ bits of x' against the ray number in said auxiliary memory, all density measurements from said auxiliary memory acting simultaneously, each on the pixels lying along its ray, using a multi-operand ACCUMULATE operation into the density field of the main memory, the process being repeated for all groups in a view; and the process is repeated for all views to thereby reconstruct the image in said main associative memory;

the convolution first processor being sized to match the speed of the back-projection second processor, the two processors operating as a pipe-line.

* * * * *

UNITED STATES PATENT AND TRADEMARK OFFICE
CERTIFICATE OF CORRECTION

PATENT NO. : 4,491,932
DATED : January 1, 1985
INVENTOR(S) : Smil Ruhman and Isaac Scherson It is certified that error appears in the above-identified patent and that said Letters Patent are hereby corrected as shown below:

Column 3, line 2, change "association" to -- associative

Column 3, line 15, change "$2^1$" to -- $2^i$

Column 3, line 57, change "of a" to -- by a

Column 5, line 29, change "(2)LOAD x,(3)LOAD m" to -- (2)LOAD $\underline{x}$,(3)LOAD $\underline{m}$

UNITED STATES PATENT AND TRADEMARK OFFICE
CERTIFICATE OF CORRECTION

PATENT NO. : 4,491,932
DATED : January 1, 1985
INVENTOR(S) : Smil Ruhman and Isaac Scherson It is certified that error appears in the above-identified patent and that said Letters Patent are hereby corrected as shown below:

Column 4, line 34, change "cell" to -- word

Column 4, line 53, change "SET-" to -- SETAG-

Column 4, line 63, change "'zero'" to -- "one"

Column 4, line 64, change "association" to -- associative

Column 5, line 8, change "$LOAD_x$" to -- $LOAD_{\underline{x}}$

Column 5, line 10, change "$LOAD_m$" to -- $LOAD_{\underline{m}}$

Column 5, line 32, change "x and m" to -- $\underline{x}$ and $\underline{m}$

Column 5, line 55, change "$m_{N+i}$" to -- $m_{N+i+2}$

Column 6, line 1, change "and" to -- an

Column 6, line 12, change "d(f,g,h)" to -- $\underline{d}(f,g,h,)$

Column 6, line 21, change "$a_{N+R}$" to -- $a_{K-1}$

Column 6, line 22, change "$a_{K-1}$" to -- $a_{N+R+1}$

Column 7, line 43, change "LOAD X, Load m" to -- LOAD $\underline{x}$, LOAD $\underline{m}$ Column 7, line 45, change "m ← d" to -- $\underline{m}$ ← $\underline{d}$ Column 7, line 46, change "s*d" to -- $\underline{s}*\underline{d}$ Column 8, line 64, change "$\sum_{i=1}^{v}$" to -- $\sum_{i=1}^{V}$

UNITED STATES PATENT AND TRADEMARK OFFICE
CERTIFICATE OF CORRECTION

PATENT NO. : 4,491,932
DATED : January 1, 1985
INVENTOR(S) : Smil Ruhman and Isaac Scherson It is certified that error appears in the above-identified patent and that said Letters Patent are hereby corrected as shown below:

Column 5, 6, 7, and 8, replace Table 1 as follows:

Table 1
Multi-operand ACCUMULATE Instruction

| STEP | MEMORY A | MEMORY B | CONTROL |
|---|---|---|---|
| 0 | $x \leftarrow 0; m \leftarrow \underline{d}(N)$; SETAG;WRITE | $y,p \leftarrow \underline{d}(0)$; SETAG;COMPARE | CNT $\leftarrow$ 0 |
| 1 | $x \leftarrow \underline{d}(N)$;SETAG | | |
| 2 | $m \leftarrow \underline{d}(CNT,N,N+1) + \underline{a}^*\underline{d}(N+2,N+3,\ldots,N+R+1)$ ;COMPARE | | |
| 3 | $x \leftarrow \underline{d}(CNT)$;WRITE | | |
| 4 | $x \leftarrow \underline{d}(N,CNT)$; SETAG;COMPARE | | |
| 5 | $x \leftarrow \underline{d}(N)$;WRITE | $y \leftarrow 0$; SETAG;COMPARE | |
| 6 | $x \leftarrow \underline{d}(CNT)$;SETAG | | |
| 7 | $m \leftarrow \underline{d}(CNT,N,N+1) + \underline{a}^*\underline{d}(N+2,N+3,\ldots,N+R+1)$;COMPARE | | |
| 8 | $x \leftarrow \underline{d}(N)$;WRITE | | |
| 9 | $x \leftarrow 0$;SETAG;COMPARE | | |
| 10 | $x \leftarrow \underline{d}(CNT)$;WRITE | $y,p \leftarrow \underline{d}(CNT+1)$; SETAG;COMPARE | CNT=CNT+1 if CNT<N return to step 1 |

UNITED STATES PATENT AND TRADEMARK OFFICE
CERTIFICATE OF CORRECTION

PATENT NO. : 4,491,932
DATED : January 1, 1985
INVENTOR(S) : Smil Ruhman and Isaac Scherson It is certified that error appears in the above-identified patent and that said Letters Patent are hereby corrected as shown below:

Column 7 and 8, lines 49 to 57, replace format with the following:

```
d (N+2, N+3,..., N+R+1)    1  1   .... 1 1 0000 .. 000 .... 00  ) gating s in
*                                                                ) flag field
s                          s_{R-1}s_{R-2} .... s_1 s_0 xxxx .. xxx .... xx  ) of m s*d (N+2, .., N+R+1)       s_{R-1}s_{R-2} .... s_1 s_0 0000 .. 000 .... 00  ) setting
+                                                                           ) other
d (CNT, N, N+1)            0  0   .... 0 0 1100 .. 010 .... 00  ) bits of m m                          s_{R-1}s_{R-2} .... s_1 s_0 1100 .. 010 .... 00
```

Column 9, lines 24 to 28, replace format with the following:

```
       N              F      F   F+G+1                N
  +---------------+-------+-----+--------------+-------------+
  | flag          |   x   |  y  |   ax + by    |  density    |
  +---------------+-------+-----+--------------+-------------+
       32             8      8      20              1     25
```

UNITED STATES PATENT AND TRADEMARK OFFICE
CERTIFICATE OF CORRECTION

PATENT NO. : 4,491,932
DATED : January 1, 1985
INVENTOR(S) : Smil Ruhman and Isaac Scherson It is certified that error appears in the above-identified patent and that said Letters Patent are hereby corrected as shown below:

Column 9, 10, 11, and 12, replace Table 3 as follows:

Table 3

Many-to-Many Associative Compare

| STEP | MEMORY A | MEMORY B | CONTROL |
|---|---|---|---|
| 1 | $\underline{m} \leftarrow \underline{d}(L, L+1, \ldots, L+R)$; SETAG | | |
| 2 | $\underline{x} \leftarrow \underline{a}_0 \underline{d}(L-E_0, L-E_0+1, \ldots, L-1)$; WRITE | | |
| 3 | $\underline{m} \leftarrow \underline{d}(L-E_0, L-E_0+1, \ldots, L+R)$; SETAG; COMPARE | | CNT $\leftarrow$ 0 |
| 4 | $\underline{x}, \underline{m} \leftarrow \underline{d}(L, L+1, \ldots, L+R)$; WRITE | $y \leftarrow 0, p \leftarrow \underline{d}(CNT)$; SETAG; COMPARE | |
| 5 | $\underline{x}, \underline{m} \leftarrow \underline{d}(L, CNT)$; SETAG, COMPARE | | |
| 6 | $\underline{m} \leftarrow \underline{a}^a \underline{d}(L+1, L+2, \ldots, L+R)$; WRITE | | |
| 7 | $\underline{m} \leftarrow \underline{d}(L, CNT)$; SETAG | $y \leftarrow \underline{d}(CNT)$; SETAG; COMPARE | |
| 8 | $\underline{x} \leftarrow \underline{d}(L)$; COMPARE | | CNT = CNT+1 |
| 9 | $\underline{m} \leftarrow \underline{a}^a \underline{d}(L+1, L+2, \ldots, L+R)$; WRITE | $y \leftarrow 0, p \leftarrow \underline{d}(CNT)$; SETAG; COMPARE | If CNT<L-E$_0$ GOTO 5 |
| 10 | $\underline{x} \leftarrow 0; \underline{m} \leftarrow \underline{d}(L+1, \ldots, L+R)$; SETAG; COMPARE | | |
| 11 | $\underline{x} \leftarrow \underline{d}(L, L+1, \ldots, L+R)$; WRITE | | |

| $a_{L+R}$ | $a_{L+1}$ | $a_L$ | $a_{L-1}$ | $a_0$ |
|---|---|---|---|---|

R-bit flag       L-bit number
     Auxiliary
       Flag

UNITED STATES PATENT AND TRADEMARK OFFICE
CERTIFICATE OF CORRECTION

PATENT NO. : 4,491,932
DATED : January 1, 1985
INVENTOR(S) : Smil Ruhman and Isaac Scherson It is certified that error appears in the above-identified patent and that said Letters Patent are hereby corrected as shown below:

Column 11, line 25, change

" $6 + 5(L-E_C) = 6 + 5k$ "

to --

$6 + 5(L-E_C) = 6 + 5k$

Column 12, line 41, change "h=[h$_i$]" to -- $\underline{h}$=[h$_i$]
Column 12, line 41, change "p=[p$_i$]" to -- $\underline{p}$=[p$_i$]
Column 12, line 45, change "(h*p)k" to -- ($\underline{h}$*$\underline{p}$)k Column 14, lines 5 to 21, replace Table 5 as follows:

TABLE 5. CARRY PROPAGATION.

SB=starting bit position, SF=final bit position.

| STEP | OPERATION |
|---|---|
| 0 | BCT ← 0 |
| 1 | $\underline{m}$ ← $\underline{d}$(SB+BCT+CY);SET |
| 2 | $\underline{x}$ ← $\underline{d}$(CY);COMPARE |
| 3 | $\underline{x}$ ← $\underline{d}$(SB+BCT);WRITE |
| 4 | $\underline{x}$ ← $\underline{d}$(SB+BCT+CY);SET;COMPARE |
| 5 | $\underline{x}$ ← $\underline{d}$(CY);WRITE |
| 6 | BCT ← BCT+1; if SB+BCT<SF go to 1, else exit |

UNITED STATES PATENT AND TRADEMARK OFFICE
CERTIFICATE OF CORRECTION

PATENT NO. : 4,491,932
DATED : January 1, 1985
INVENTOR(S) : Smil Ruhman and Isaac Scherson It is certified that error appears in the above-identified patent and that said Letters Patent are hereby corrected as shown below:

Column 14, lines 23 to 39, replace Table 6 as follows:

TABLE 6. SHIFT FIELDS.

SB=first bit of field to be shifted, N=number of bits to be shifted.

| STEP | OPERATION |
|---|---|
| 0 | $BCT \leftarrow 0$ |
| 1 | $\underline{x} \leftarrow 0, \underline{m} \leftarrow \underline{d}(\mathcal{T})$; SET; WRITE |
| 2 | $\underline{x}, \underline{m} \leftarrow \underline{d}(SB+BCT)$; COMPARE |
| 3 | $\underline{x}, \underline{m} \leftarrow \underline{d}(SB+BCT, \mathcal{T})$; SHIFTAG; WRITE |
| 4 | $\underline{x} \leftarrow 0, \underline{m} \leftarrow \underline{d}(\mathcal{T})$; SET; COMPARE |
| 5 | $\underline{m} \leftarrow \underline{d}(SB+BCT)$; WRITE |
| 6 | $BCT \leftarrow BCT+1$; if $BCT<N$ go to 1, else exit |

Column 14, line 50, change "102 3" to -- 1023

UNITED STATES PATENT AND TRADEMARK OFFICE
CERTIFICATE OF CORRECTION

PATENT NO. : 4,491,932
DATED : January 1, 1985
INVENTOR(S) : Smil Ruhman and Isaac Scherson It is certified that error appears in the above-identified patent and that said Letters Patent are hereby corrected as shown below:

Column 16, line 32, change "vector p" to -- vector $\underline{p}$
Column 16, line 32, change "vector h" to -- vector $\underline{h}$
Column 16, line 33, change " vector hp" to -- vector $\underline{hp}$
Column 16, line 32, change "the p data field" to -- the $\underline{p}$ data field
Column 16, line 40, change "h" to -- $\underline{h}$
Column 16, line 40, change "the p data field" to -- the $\underline{p}$ data field
Column 16, line 41, change "current h element" to -- current $\underline{h}$ element
Column 16, line 42, change "the hp field" to -- the $\underline{hp}$ field
Column 16, line 46, change "of hp starting" to -- of $\underline{hp}$ starting
Column 16, line 49, change "of hp" to -- of $\underline{hp}$
Column 17, line 27, delete the word "one"

Signed and Sealed this

First Day of March, 1988

Attest:

Attesting Officer

DONALD J. QUIGG

Commissioner of Patents and Trademarks